United States Patent
Chang et al.

(10) Patent No.: US 7,840,883 B2
(45) Date of Patent: *Nov. 23, 2010

(54) DVB-H RECEIVER FOR FORWARD ERROR CORRECTION AND METHOD THEREOF

(75) Inventors: Chih-Peng Chang, Taipei Hsien (TW); Che-Li Lin, Taipei (TW)

(73) Assignee: Mediatek Inc., Science-Based Industrial Park, Hsin-Chu (TW)

(*) Notice: Subject to any disclaimer, the term of this patent is extended or adjusted under 35 U.S.C. 154(b) by 1035 days.

This patent is subject to a terminal disclaimer.

(21) Appl. No.: 11/562,993

(22) Filed: Nov. 23, 2006

(65) Prior Publication Data

US 2008/0126915 A1    May 29, 2008

(51) Int. Cl.
*H03M 13/00* (2006.01)
(52) U.S. Cl. .................. 714/785; 714/704; 714/752
(58) Field of Classification Search .......... 714/704, 714/752, 785
See application file for complete search history.

(56) References Cited

U.S. PATENT DOCUMENTS

| | | | | |
|---|---|---|---|---|
| 3,958,220 A | * | 5/1976 | Marshall | 714/765 |
| 4,107,650 A | * | 8/1978 | Luke et al. | 714/762 |
| 5,255,272 A | * | 10/1993 | Gill et al. | 714/765 |
| 6,009,547 A | * | 12/1999 | Jaquette et al. | 714/758 |
| 6,907,559 B2 | * | 6/2005 | Hall et al. | 714/785 |
| 2008/0009251 A1 | * | 1/2008 | Wahl et al. | 455/182.1 |

OTHER PUBLICATIONS

NN8906375: "Error Correction Codes With Address Checking"IBM Technical Disclosure Bulletin, Jun. 1989,Volume No. 32; Issue No. 1 ;page No. 1-3.*

* cited by examiner

*Primary Examiner*—Guy J Lamarre
(74) *Attorney, Agent, or Firm*—Winston Hsu; Scott Margo

(57) ABSTRACT

A DVB-H receiver for performing forward error correction is disclosed. The DVB-H receiver includes: a tuner, for receiving a data stream; a base-band receiver, coupled to the tuner, for continuously extracting and transmitting data bytes of an MPE-FEC frame from the data stream; a backend system, coupled to the base-band receiver, for generating corresponding syndromes of the extracted data bytes once all data bytes of the MPE-FEC frame are received, outputting the syndromes to the base-band receiver, and forward error correcting the MPE-FEC frame according to error values corresponding to the syndromes; and a storage device, coupled to the backend system, for storing the extracted data bytes. The base-band receiver generates the error values and error locations according to the received syndromes, and then outputs the error values and error locations to the backend system.

7 Claims, 3 Drawing Sheets

DVB-H RECEIVER FOR FORWARD ERROR CORRECTION AND METHOD THEREOF

BACKGROUND

As more and more sophisticated mobile devices compete for supremacy in the electronics arena, manufacturers can now enable handheld devices such as mobile phones to support multimedia streaming content. A key standard in this technology is the DVB-H standard, which can transmit digital television signals and Internet services. An additional error correction scheme is also introduced to prevent reception problems that may occur in certain environments. This additional error correction scheme is known as multi-protocol-encapsulation forward-error-correction (MPE-FEC).

Please refer to FIG. 1. FIG. 1 is a DVB-H receiver 100 according to the related art. The DVB-H receiver 100 comprises a tuner 110, a base-band receiver 120, an on-chip memory (embedded memory) 130, and a backend system 140. The base-band receiver 120 is utilized for receiving a data stream, extracting data bytes of an MPE-FEC frame, storing the extracted data bytes to the on-chip memory 130, and performing Reed-Solomon (RS) decoding on the MPE-FEC frame in order to forward error correct the data.

In general, RS decoding of an MPE-FEC frame is performed in four stages. Once an entire MPE-FEC frame is received, syndromes of the MPE-FEC data are generated, where each row (or each codeword) of an MPE-FEC frame corresponds to 64 syndromes, and the syndromes must be generated in an interleaved sequence. The syndromes are utilized to first calculate error locations, and then calculate error values associated with the found error locations. Finally, the MPE-FEC frame data is corrected, by combining the error values and the original frame data according to the error locations.

In the related art, all RS decoding processes are performed by the base-band receiver 120. Once the RS decoding is complete, the error corrected MPE-FEC frame can then be sent to the backend system 140 for further processing. The on-chip memory 130 is typically an SRAM. As the size of an MPE-FEC frame with 1024 rows is 2 Mbits, a large on-chip SRAM is required for de-interleaving the MPE-FEC frame, involving considerable expense.

SUMMARY

It is an objective of the present invention to provide a DVB-H receiver and method that supports forward error correction, and does not require an on-chip memory.

Briefly described, the disclosed DVB-H receiver comprises: a tuner, for receiving a data stream; a base-band receiver, coupled to the tuner, for continuously extracting and transmitting data bytes of an MPE-FEC frame from the data stream; a backend system, coupled to the base-band receiver, for de-interleaving the data bytes and generating corresponding syndromes of the data bytes once all data bytes of the MPE-FEC frame are received from the base-band receiver, and forward error correcting the MPE-FEC frame according to error values corresponding to the syndromes calculated by the base-band receiver; and a storage device, coupled to the backend system, for storing the extracted data bytes. The base-band receiver receives the syndromes from the backend system to generate the error values and corresponding error locations.

A method is also disclosed. The method comprises: receiving a data stream; continuously extracting data bytes of an MPE-FEC frame; storing the extracted data bytes into a storage device; once all data bytes of the MPE-FEC frame have been stored, de-interleaving the data bytes and generating corresponding syndromes utilizing a backend device; calculating error locations and error values utilizing a base-band receiver; and the backend device utilizing the error values to forward error correct the stored data bytes.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
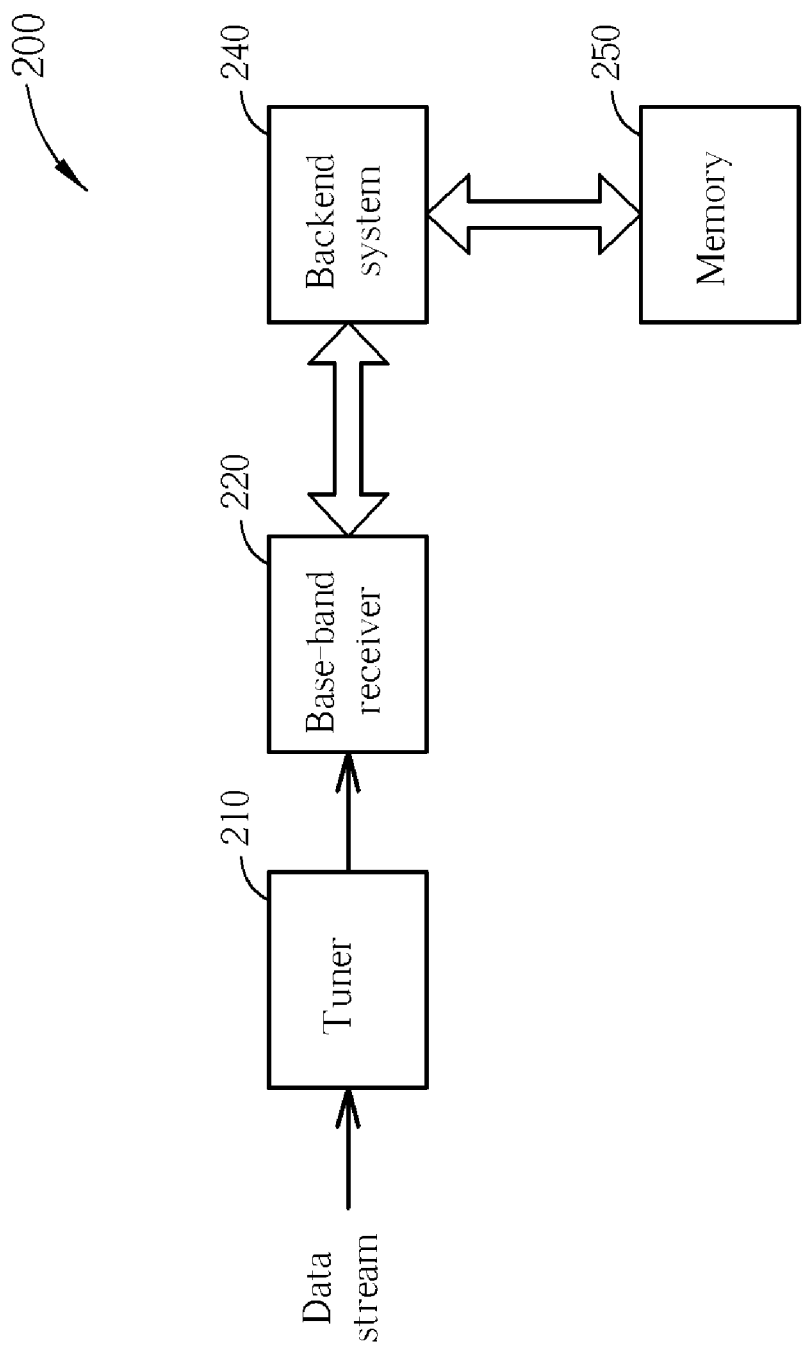
FIG. 2 is a diagram of a DVB-H receiver according to an exemplary embodiment of the present invention.

Please refer to FIG. 2. FIG. 2 is a diagram of a DVB-H receiver 200 according to an exemplary embodiment of the present invention. The DVB-H receiver 200 comprises: a tuner 210, a base-band receiver 220, a backend system 240, coupled to the base-band receiver 220 by means of a bi-directional bus or any possible connections, and a memory 250, coupled to the backend system 240. In this embodiment the memory 250 is an external memory and implemented by a DRAM; please note, however, that this is merely one embodiment of the disclosed invention.

As can be seen from the diagram, the disclosed DVB-H receiver 200 does not comprise an on-chip memory coupled to the base-band receiver 220. Instead the MPE-FEC frame is stored in the external memory 250 (the DRAM in this embodiment). When a data stream is received by the tuner 210 it is sent to the base-band receiver 220 for conversion to an MPEG-2 standard, and data bytes of an MPE-FEC frame are extracted and sent directly to the backend system 240, which stores the MPE-FEC frame data in the memory 250. As is well known in the art, data bytes of the MPE-FEC frame are built up column by column, so an entire MPE-FEC frame must be received before further RS decoding processes can be carried out.

Once the entire MPE-FEC frame is stored in the memory 250, the backend system 240 performs de-interleaving and syndrome calculation on the MPE-FEC data to generate corresponding syndromes. The generated syndromes are then sent across the bi-directional bus to the base-band receiver 220, which then proceeds to generate error locations and error values according to the syndromes. The syndromes may be stored in the memory 250, or directly sent to the base-band receiver 220, and both these modifications fall within the scope of the present invention. The determined error locations and error values are then sent back across the bi-directional bus to the backend system 240, which combines the error values with the MPE-FEC frame according to the error locations, for completing forward error correction.

Figure 1:
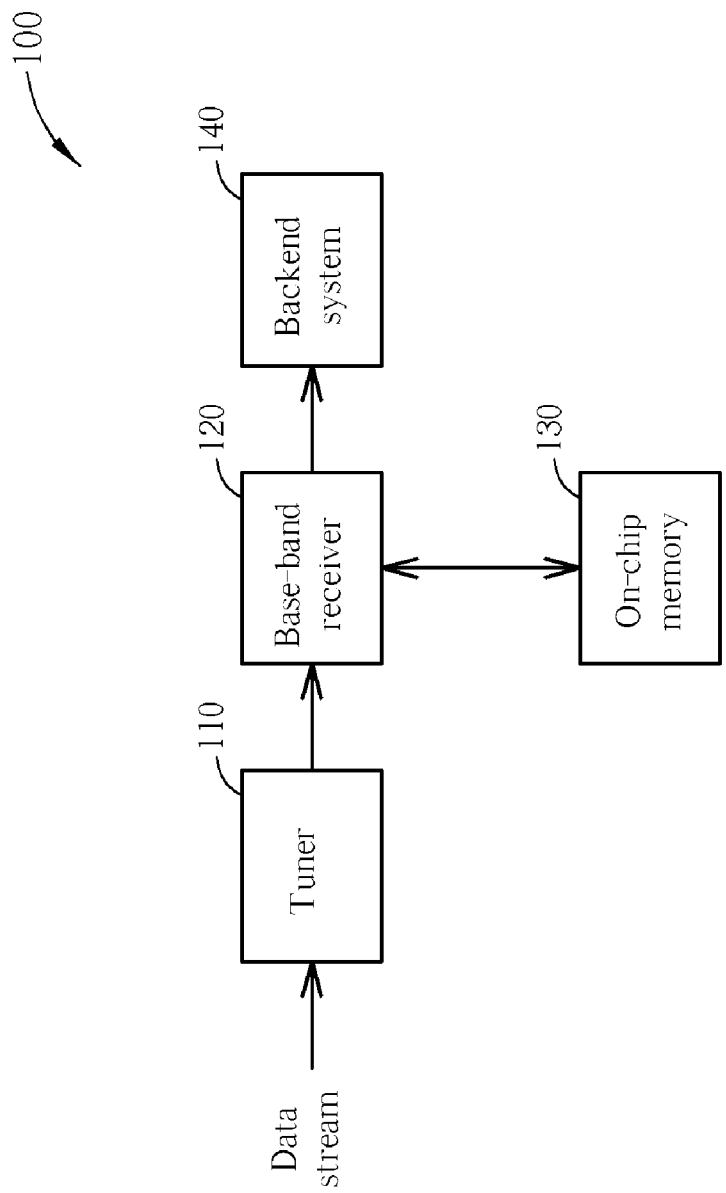
FIG. 1 is a diagram of a DVB-H receiver according to the related art.

In the related art DVB-H receiver 100 shown in FIG. 1, all RS decoding processes are performed by the base-band receiver 120, by accessing the on-chip memory 140. As the calculation of error values and error locations requires complex computation, the disclosed DVB-H receiver 200 still utilizes the base-band receiver 220 for performing these functions. The DVB-H receiver 200, however, minimizes the amount of data being sent across the bus between the base-band receiver 220 and the backend system 240 by utilizing the backend system 240 to perform de-interleaving and syndrome calculation, and for combining the error values with the original MPE-FEC frame to produce an error corrected MPE-FEC frame. This advantageously avoids the entire MPE-FEC frame data from being extracted and sent across the bi-directional bus. This also enables the RS decoding processes to be performed efficiently without an on-chip memory.

Figure 3:
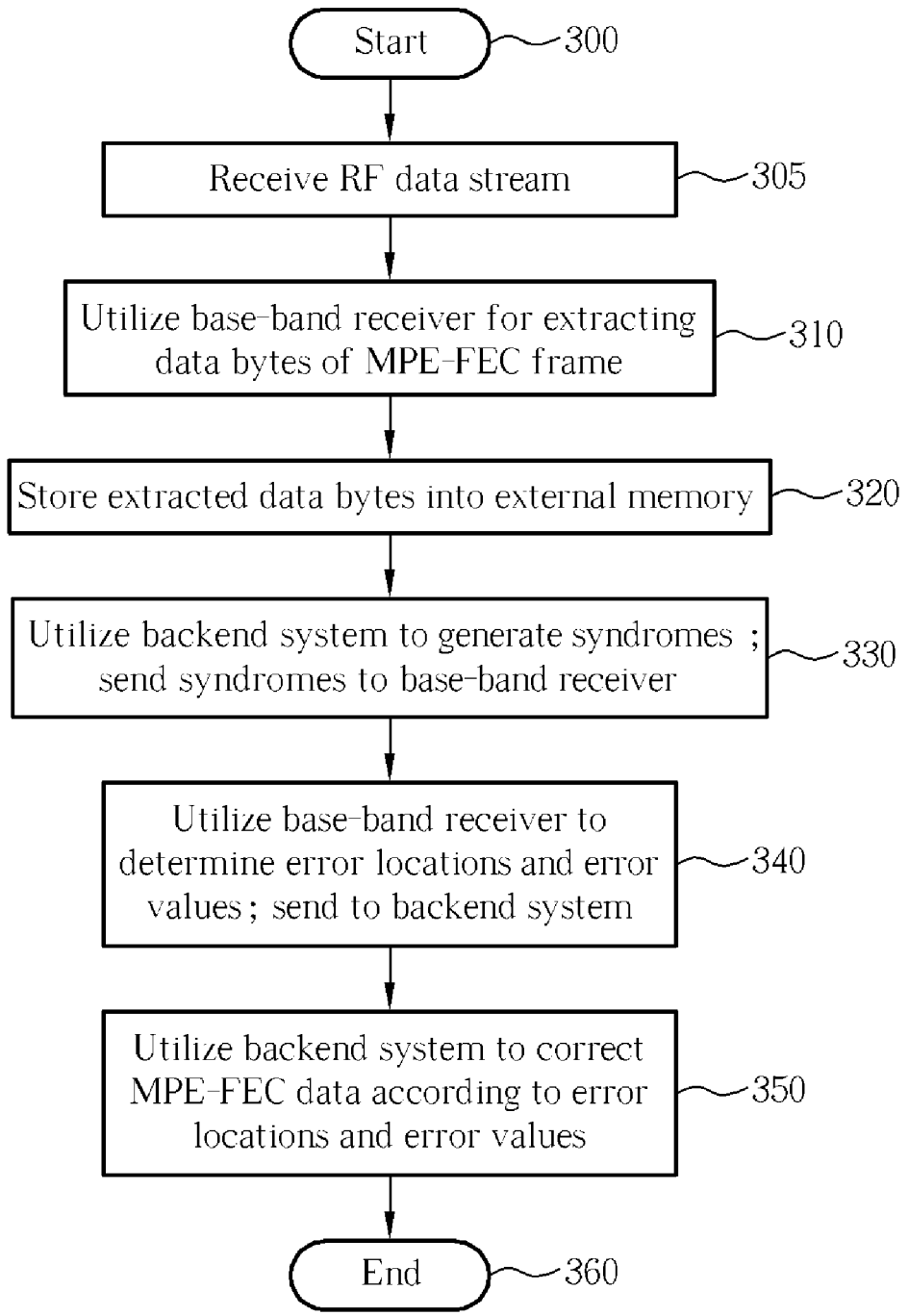
FIG. 3 is a flowchart of a method according to an exemplary embodiment of the present invention.

Please refer to FIG. 3. FIG. 3 is a flowchart of a method according to an exemplary embodiment of the present invention. The steps are as follows:

Step 300: Start;

Step 305: Receive an RF data stream;

Step 310: Utilize the base-band receiver for extracting data bytes of an MPE-FEC frame;

Step 320: Store the extracted data bytes into the external memory (DRAM) that can be accessed by the backend system;

Step 330: Utilize the backend system to generate syndromes of the MPE-FEC frame, and send the generated syndromes to the base-band receiver;

Step 340: Utilize the base-band receiver to determine error locations and error values according to the syndromes, and send the error locations and error values to the backend system;

Step 350: Utilize the backend system to correct the MPE-FEC data according to the error locations and the error values;

Step 360: End.

The disclosed DVB-H receiver 200 utilizes the backend system 240 for performing syndrome calculation and error correction so as to minimize the amount of data traffic across the bi-directional bus. As the MPE-FEC frame is stored in the memory 250, and only syndromes, error locations, and error values are sent across the bus, the overhead is significantly reduced.

It is an advantage of the disclosed invention that the DVB-H receiver 200 does not require an SRAM, thereby greatly reducing the associated cost. It is a further advantage that the backend system 240 performs syndrome calculation and forward error correction, thereby reducing traffic between the base-band receiver 220 and the backend system 240.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Digital Video Broadcasting-Handheld (DVB-H) receiver for performing forward error correction, the DVB-H receiver comprising:

a tuner, for receiving a data stream;

a base-band receiver, coupled to the tuner, for continuously extracting and transmitting data bytes of a multi-protocol-encapsulation forward-error-correction (MPE-FEC) frame from the data stream;

a backend system, coupled to the base-band receiver, for generating corresponding syndromes of the extracted data bytes once all data bytes of the MPE-FEC frame are received, outputting the syndromes to the base-band receiver, and forward error correcting the MPE-FEC frame according to error values corresponding to the syndromes; and a storage device, coupled to the backend system, for storing the extracted data bytes;

wherein the base-band receiver generates the error values and error locations according to the received syndromes and then outputs the error values and error locations to the backend system.

2. The DVB-H receiver of claim 1, wherein the storage device is directly connected to the backend system.

3. The DVB-H receiver of claim 1, wherein the extracted data bytes are stored in the storage device only.

4. The DVB-H receiver of claim 1, wherein the storage device is a DRAM memory.

5. A method for performing forward error correction in a Digital Video Broadcasting-Handheld (DVB-H) receiver, the method comprising:

receiving a data stream;

continuously extracting data bytes of a multi-protocol-encapsulation forward-error-correction (MPE-FEC) frame;

storing the extracted data bytes into a storage device;

once all data bytes of the MPE-FEC frame have been stored, generating corresponding syndromes utilizing a backend device by accessing the storage device;

sending the syndromes to a base-band receiver to generating error values and error locations from the syndromes;

outputting the generated error values and error locations to the backend device; and utilizing the error values and error locations to forward error correct the stored data bytes.

6. The method of claim 5, further comprising: directly connecting the storage device to the backend system.

7. The method of claim 6, wherein the extracted data bytes are stored in the storage device only.

* * * * *